United States Patent
Kobayasi et al.

[19]

[11] Patent Number: 5,947,109

[45] Date of Patent: Sep. 7, 1999

[54] DELIVERY WARMER

[75] Inventors: Sinichiro Kobayasi; Haruo Ida, both of Osaka; Kiyonobu Yoshida; Tomoaki Kitano, both of Ikoma; Takashi Okamoto; Tatsuo Yoshizu, both of Kobe, all of Japan

[73] Assignee: Matsushita Electric Industrial Co., Ltd., Osaka, Japan

[21] Appl. No.: 09/009,329

[22] Filed: Jan. 20, 1998

[30] Foreign Application Priority Data

Jan. 20, 1997 [JP] Japan ..................... 9-007287
Oct. 30, 1997 [JP] Japan ..................... 8-298268

[51] Int. Cl.⁶ .................................................. A47G 23/04
[52] U.S. Cl. .......................... 126/261; 126/251; 126/265; 126/275 R
[58] Field of Search ..................... 126/206–208, 126/261–266, 38, 43, 250–254, 9 B, 50, 275 R; 431/298, 328

[56] References Cited

U.S. PATENT DOCUMENTS 4,243,017  1/1981  Diederich .

FOREIGN PATENT DOCUMENTS 9-238842   9/1997   Japan .
9-238843   9/1997   Japan .
2163183    2/1986   United Kingdom .

*Primary Examiner*—James C. Yeung
*Attorney, Agent, or Firm*—Pollock, Vande Sande & Amernick

[57] ABSTRACT

A delivery warmer comprises a catalytic combustion heat generating device, a container accommodating cooked food, and a container casing accommodating the container. In the catalytic combustion heat generating device, a fuel tank stores liquefied fuel gas. A nozzle section gasifies and injects the liquefied fuel gas. A combustion section introduces gas mixture of the gasified fuel gas and air, and causes a catalytic reaction for burning the gas mixture. An igniter ignites the gas mixture and commences the catalytic reaction. Thus, heat generated from the catalytic combustion heat device is used to warm the container accommodated in the container casing. The cooked food is kept warm and tasty for a long time.

19 Claims, 4 Drawing Sheets

DELIVERY WARMER

BACKGROUND OF THE INVENTION

1. Field of the Invention

The present invention relates to a delivery warmer used for keeping cooked food warm and tasty during a delivery to a customer.

2. Prior Art

FIG. 11 shows an arrangement of a conventional delivery warmer. A container 101, made of cardboard or corrugated board, accommodates cooked food (not shown). A container casing 102 has a heat insulating structure according to which a heat insulating layer 103, such as a urethane foam layer, is fully provided along an entire surface of the container casing 102. The container 101 is accommodated in this container casing 102. A lid 104, provided at an opening end of the container casing 102, is closed to keep the cooked food warm and tasty in the container 101.

However, according to the above-described arrangement of the conventional delivery warmer, the temperature of the container casing 102 is substantially the same as an ambient temperature when the container 101 is accommodated in the container casing 102. There is a large temperature difference between the container casing 102 (e.g., room temperature) and the container 101 accommodating the cooked food (e.g., 50–100° C.). Thus, the container 101, when entered in the container casing 102, is cooled down by the low-temperature body of the container casing 102.

Although the container casing 102 has the heat insulating structure, its ability is limited to a certain degree. Thus, the container casing 102 cannot stop releasing heat to the outside. Thus, the container casing 102 continuously radiates the heat to the outside, decreasing the temperature of the container 101. Therefore, there is a possibility that the cooked food cannot be kept warm and tasty after an elapse of a predetermined time which is normally required for delivering the container 101 to customers.

SUMMARY OF THE INVENTION

In view of the foregoing, a principal object of the present invention is to provide a delivery warmer which is capable of keeping cooked food warm and tasty in a container until the container is delivered to a customer.

In order to accomplish the above-described and other related objects, the present invention provides an excellent and reliable delivery warmer comprising a catalytic combustion heat generating device which generates heat by utilizing a catalytic reaction, a container which accommodates cooked food, and a container casing which accommodates the container. The heat generation amount is controlled, thus the cooked food is kept warm and tasty in the container by the heat generated from the catalytic combustion heat generating device.

With this arrangement, it becomes possible to warm up the container in response to a reduction in the temperature of the cooked food.

More specifically, a first aspect of the present invention provides a delivery warmer comprising a catalytic combustion heat generating device, a container accommodating cooked food, and a container casing accommodating the container. The catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction, thereby generating heat from the catalytic combustion heat generating device to warm the container accommodated in the container casing.

With this arrangement, the heat generated from the catalytic combustion heat generating device is adequately transferred to the container. Thus, it becomes possible to keep the cooked food warm and tasty in the container until the container is delivered to the customer. The catalytic combustion heat generating device, used as the heat generating source, is compact and handy.

Preferably, a heat transfer board, made of a heat conductive metallic member, is assembled with the combustion section to transfer the heat generated from the catalytic combustion heat generating device to the container accommodated in the container casing. Providing the heat transfer board is effective to widen a heat radiation area for the combustion section. The inside of the container casing can be warmed up smoothly. In other words, the container accommodating the cooked food can be warmed up effectively and uniformly.

Preferable, the catalytic combustion heat generating device is disposed under the container casing. This arrangement is effective to transfer the heat generated from the combustion section quickly to the container casing. The catalytic combustion heat generating device does not interfere with operator's hands. The container casing can be carried easily while keeping good balance.

Preferably, the catalytic combustion heat generating device is provided outside the container casing, and the fuel tank is detachably engaged with the catalytic combustion heat generating device. With this arrangement, when the fuel tank becomes empty, the fuel tank can be removed smoothly from the container casing for recharging the fuel tank with liquefied fuel gas. When the empty fuel tank is replaced by another fuel tank, the exchange operation can be performed smoothly.

Preferably, the igniter is operable from outside of the container casing. This facilitates an igniting operation when the container is heated in the container casing.

Preferably, the catalytic combustion heat generating device is detachable from the container casing. When the container casing needs to be cleaned up or is damaged, the catalytic combustion heat generating device can be easily disassembled. Thus, the container casing can be easily fixed or replaced by a new one.

Preferably, the container is accommodated in a container storage provided in the container casing, and a heat conductive metallic layer is formed along an inside surface of the container storage. With this arrangement, heat of the catalytic combustion heat generating device can be uniformly transferred to every spot in the container storage. When the inside of the container storage is contaminated by food liquid, such liquid can be wiped away easily.

Preferably, the container is accommodated in the container storage provided in the container casing, a heat-transfer board storage is provided at a lower part of the container casing independent of the container storage, and the heat transfer board is accommodated in the heat-transfer board storage. When any harmful insect is found in the container storage, it can be removed away easily. The inside of the container casing can be cleaned up easily and is always kept clean.

Preferably, the heat-transfer board storage is provided with an opening so that the heat transfer board can be taken out of the heat-transfer board storage. This makes it easy to remove the heat transfer board together with the catalytic combustion heat generating device from the container casing. When the container casing is contaminated or damaged, or when the catalytic combustion heat generating device is damaged or out of order, it becomes easy to fix a troubled portion or replace it by a new one.

Preferably, the container casing is supported by legs which provide an installation space under the heat-transfer board storage. The catalytic combustion heat generating device is disposed in the installation space, and the legs are connected to the heat transfer board accommodated in the heat-transfer board storage. When the container casing hits a hard floor, the shock can be received and absorbed by the legs and the heat transfer board which are both made of rigid members.

A second aspect of the present invention provides a delivery warmer comprising a catalytic combustion heat generating device, a container accommodating cooked food, and a container casing accommodating the container. The catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, an igniter for igniting the gas mixture and commencing the catalytic reaction, and a temperature control device for controlling a fuel gas amount supplied to the combustion section so as to adjust a temperature of the combustion section, thereby generating heat from the catalytic combustion heat generating device to warn the container accommodated in the container casing.

By supplying the liquefied fuel gas from the fuel tank, the nozzle section gasifies and injects the liquefied fuel gas. The gasified and injected fuel gas is mixed with air to form gas mixture which is introduced into the combustion section to cause the catalytic reaction to generate heat under the control of the temperature control device. Thus, it becomes possible to maintain the temperature of the container at an arbitrary value by utilizing the heat generated by the catalytic reaction. This makes it possible to keep the cooked food warm and tasty.

Preferably, the temperature control device comprises a thermal sensitive magnetic substance whose magnetic characteristics varies rapidly at its Curie point, a magnet provided adjacent to the thermal sensitive magnetic substance in an opposed relationship to attract the thermal sensitive magnetic substance, and a valve adjusting the fuel gas amount supplied to the combustion section. The temperature control device closes the valve to stop supplying the fuel gas to the combustion section when the temperature of the thermal sensitive magnetic substance exceeds its Curie point, thereby controlling the temperature of the combustion section.

The heat generated from the combustion section is transferred to the thermal sensitive magnetic substance. The Curie point is generally dependent on the composition of the magnetic substance. When the temperature of the thermal sensitive magnetic substance reaches its Curie point, the magnet cannot attract the thermal sensitive magnetic substance. Thus, the valve is closed by the function of an associated spring so as to stop supplying the gas mixture to the combustion section. Upon stopping the gas mixture, the temperature of the combustion chamber is decreased. The thermal sensitive magnetic substance has a very small hysteresis. Due to such a small hysteresis, the thermal sensitive magnetic substance can restore to its original state in response to a tiny decrease in the temperature. Therefore, the thermal sensitive magnetic substance can attract the magnet again so as to reopen the valve. As the interruption is very short, the combustion section is still maintained at a higher temperature. Thus, the catalytic reaction restarts when the liquefied fuel gas is injected from the nozzle section. By repeating the above-described operation, it becomes possible to maintain the combustion section at a desired temperature for a long time.

A third aspect of the present invention provides a delivery warmer comprising a catalytic combustion heat generating device, a container accommodating cooked food, and a container casing accommodating the container. The catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction. The container casing is equipped with a heat transfer board made of a heat conductive metallic member and disposed in the container casing for transferring heat generated from the catalytic combustion heat generating device to the container. A surface of the heat transfer board is covered by a protecting sheet.

With this arrangement, it becomes possible to surely prevent user's hands from directly touching the high-temperature heat transfer board when the user enters or takes out the container into or from the container casing.

Preferably, the protecting sheet is constituted by a synthetic resin film comprising a heat conductive metallic layer provided adjacent to the heat transfer board. Providing the heat conductive metallic layer adjacent to the heat transfer board is effective to realize a uniform heat transfer from the catalytic combustion heat generating device to the container.

Preferably, a lid is provided at an opening end of the container casing, and the protecting sheet has one end connected to the opening end of the container casing. According to this arrangement, the protecting sheet is hinged at the opening end of the container casing. Therefore, the protecting sheet can be taken out of the container casing when the container casing needs to be cleaned up. The inside of the container casing can be kept clean. On the other hand, when the container is housed in the container casing, the surface of the heat transfer board can be surely covered by the protecting sheet.

A fourth aspect of the present invention provides a delivery warmer comprising a catalytic combustion heat generating device, a container accommodating cooked food, and a heat transfer board made of a heat conductive metallic member and connected to the catalytic combustion heat generating device. The catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction. The heat transfer board is detachably engaged with the container, thereby transferring heat from the catalytic combustion heat generating device to the container via the heat transfer board. Connecting the heat transfer board with the container is advantageous in that the container can be directly heated. Thus, the cooked food can be effectively warmed up and kept tasty. Furthermore, as the construction is simple, it is handy to deliver.

A fifth aspect of the present invention provides a delivery warmer comprising a catalytic combustion heat generating device, a container accommodating cooked food, and a container casing accommodating the container, wherein the catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction. The combustion section is connected to a heat transfer board made of a heat conductive metallic member, thereby transferring heat from the combustion section to the container via the heat transfer board.

A sixth aspect of the present invention provides a delivery warmer comprising a catalytic combustion heat generating device, a container accommodating cooked food, and a container casing accommodating the container, wherein the catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction. The catalytic combustion heat generating device is disposed under the container casing. And, a heat transfer board made of a heat conductive metallic member is connected to the combustion section, so that heat generated from the combustion section is transferred to the container via the heat transfer board.

A seventh aspect of the present invention provides a delivery warmer comprising a catalytic combustion heat generating device, a container accommodating cooked food, and a container casing accommodating the container, wherein the catalytic combustion heat generating device comprises a fuel tank for storing liquefied fuel gas, a nozzle section for gasifying and injecting the liquefied fuel gas, a combustion section for introducing gas mixture of the gasified fuel gas and air and causing a catalytic reaction for burning the gas mixture, and an igniter for igniting the gas mixture and commencing the catalytic reaction. The catalytic combustion heat generating device is disposed under the container casing. The delivery warmer further comprising a heat transfer board made of a heat conductive metallic member and connected to the combustion section, a container storage for accommodating the container and provided in the container casing, a heat-transfer board storage provided at a lower part of the container casing independent of the container storage, so that the heat transfer board can be accommodated in the heat-transfer board storage, thereby transferring heat from the catalytic combustion heat generating device to the container via the transfer board.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
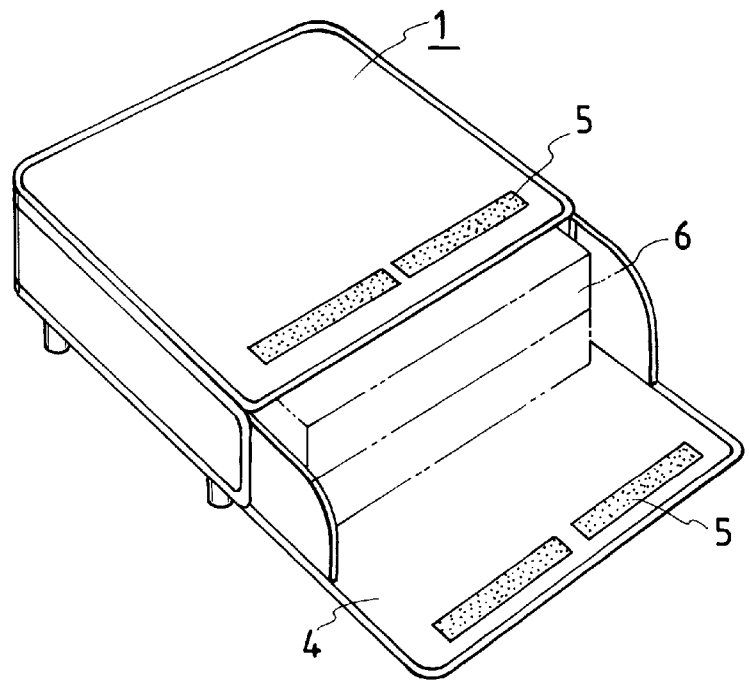
FIG. 1 is a perspective view showing an upside appearance of a delivery warmer in accordance with a first embodiment of the present invention.
Figure 2:
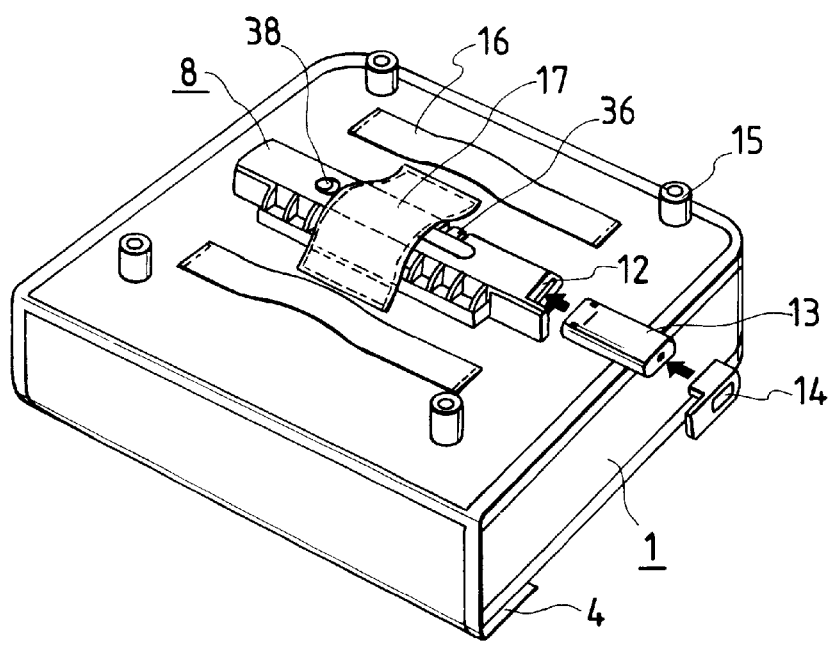
FIG. 2 is a perspective view showing a downside appearance of the delivery warmer in accordance with the first embodiment of the present invention.
Figure 3:
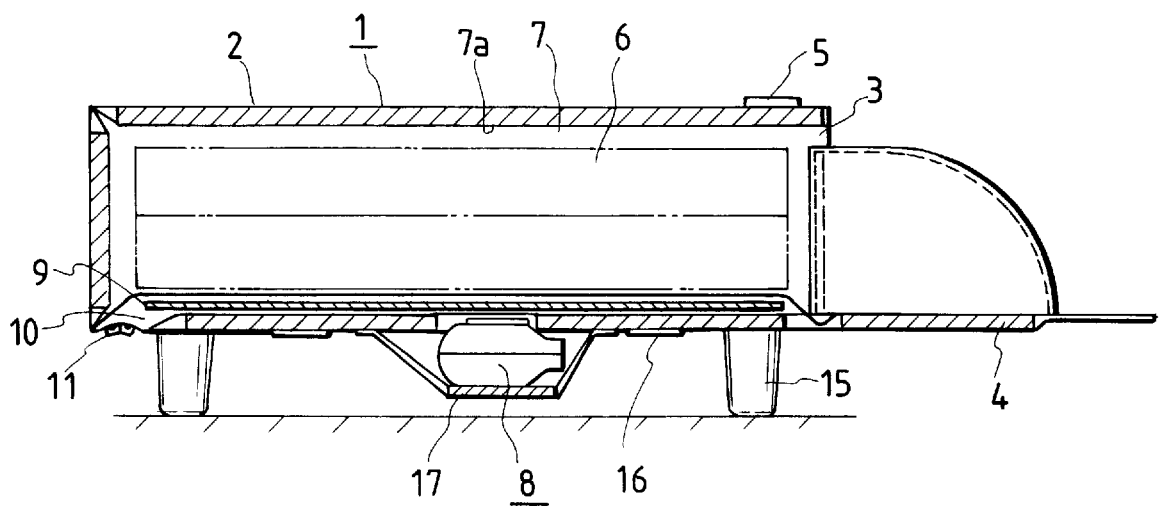
FIG. 3 is a cross-sectional view showing the delivery warmer in accordance with the first embodiment of the present invention.
Figure 4:
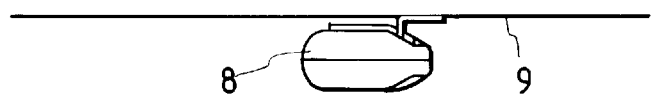
FIG. 4 is a side view showing a catalytic combustion heat generating device attached on a heat transfer board of the delivery warmer in accordance with the first embodiment of the present invention.
Figure 5:
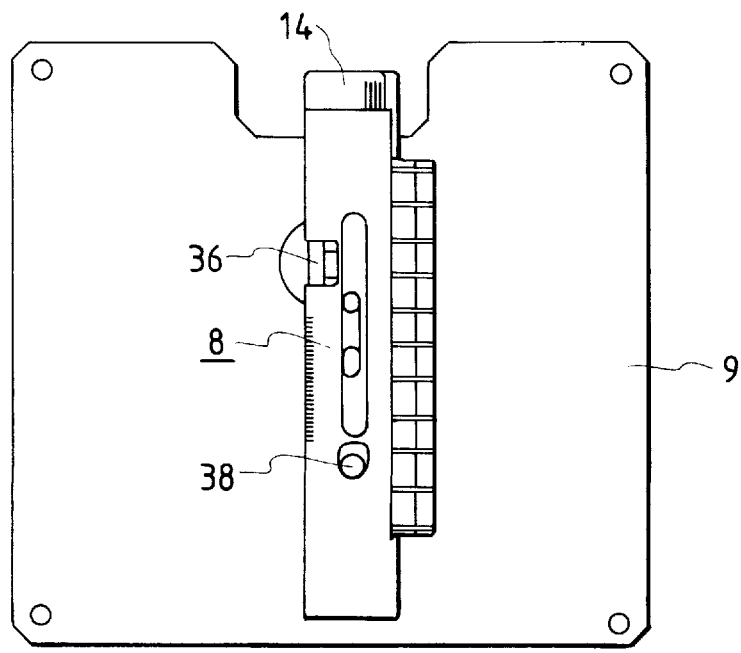
FIG. 5 is a bottom view showing a downside appearance of the catalytic combustion heat generating device attached on the heat transfer board of the delivery warmer in accordance with the first embodiment of the present invention.

Preferred embodiments of the present invention will be explained with reference to the accompanying drawing. Identical parts are denoted by the same reference numerals throughout the drawings.

First Embodiment

As shown in FIGS. 1 through 7, a container casing 1 comprises a thin sheet made of nylon or the like. A heat insulating member 2, made of urethane foam or polyester mat or the like, is provided inside the container casing 1 along the entire surface thereof. The heat insulating member 2 has a function of keeping the temperature of an inside of the container casing 1. An opening 3 is provided at one end of the container casing 1. A lid 4 is integrally provided at the opening edge of the container casing 1 and is foldable so as to close the opening 3. Plane fasteners 5, which are a mated pair, are provided on an outer surface of the container casing 1 and an inside surface of the lid 4, respectively. When the lid 4 is folded to close the opening 3, opposing plane fasteners 5 are directly brought into contact and engaged firmly with each other so as to give a fixing force for holding the lid 4 in a closed condition. A container 6, accommodating cooked food (not shown), is made of cardboard or corrugated board. The container 6 has a size to be suitably accommodated in a container storage 7 provided inside the container casing 1. A heat conductive metallic layer 7a is formed on an inside surface of the container storage 7. The heat conductive metallic layer 7a may be formed by coating a vinyl chloride film on the surface of an aluminum member.

A catalytic combustion heat generating device 8 is installed on a heat transfer board 9 which is made of heat conductive material such as aluminum or copper. The heat transfer board 9 is a thin and light plate having a thickness of approximately 1 mm. The heat transfer board 9 is accommodated in a heat-transfer board storage 10 provided under the container storage 7. The heat-transfer board storage 10 is separated from the container storage 7 by an appropriate partition member. An opening, formed on the bottom of the heat-transfer board storage 10, is opened or closed by a fastener 11 provided along the periphery of this opening. The heat transfer board 9 is entered into or removed from the heat-transfer board storage 10 via the opening of the heat-transfer board storage 10.

The catalytic combustion heat generating device 8 generates high-temperature heat by causing an oxidation reaction and catalytic combustion of gas mixture of fuel gas, such as butane or petroleum gas, and air. The high-temperature heat generated from the catalytic combustion heat generating device 8 is transmitted to the heat transfer board 9. The heat transfer board 9, with a wide upper surface, radiates or releases the heat so as to increase or maintain the temperature of the inside space of the container storage 7. The container 6 accommodated in the container storage 7 is thus heated from bottom by the heat transfer board 9.

The catalytic combustion heat generating device 8 is surrounded by a heat-resistive synthetic resin casing 12. The synthetic resin casing 12 protects the catalytic combustion heat generating device 8 against damages caused by mechanical impact forces added from external. Furthermore, the synthetic resin casing 12 prevents users from directly touching the high-temperature portions. A fuel tank 13, storing liquefied fuel gas, is detachably assembled with the catalytic combustion heat generating device 8. A lid 14, covering the fuel tank 13, is engaged with the opening of the casing 12. The fuel tank 13 can be removed from the casing 12 by disengaging the lid 14. Thus, the fuel tank 13 can be rechargeable easily when it becomes empty or displaceable by another fuel tank filled with the fuel.

A total of four legs 15 protrude from the bottom of the container casing 1. These legs 15, directly fixed to the heat transfer board 9 by means of screws (not shown), rigidly support the container casing 1 standing. These legs 15 cooperatively provide an appropriate installation space under the bottom of the container casing 1 when the container casing 1 stands upright as shown in FIG. 1. The catalytic combustion heat generating device 8 is placed in this installation space under the container casing 1. Elongated belts 16 are provided in parallel to each other at both sides of the catalytic combustion heat generating device 8 on the bottom surface of the container casing 1. Users can carry the container casing 1 by holding these belts 16. Thus, the belts 16 improve the handiness in delivering the container casing 1. A sheet cover 17 extends along the outer surface of the casing 12 so as to cover the high-temperature portions of the catalytic combustion heat generating device 8. Thus, the sheet cover 17 prevents user's hands from directly touching the high-temperature portions of the catalytic combustion heat generating device 8.

The catalytic combustion heat generating device 8 gasifies the liquid fuel stored in the fuel tank 13. The gasified fuel is injected from a nozzle 18. The fuel gas, injected from the nozzle 18, is mixed with air. The resultant gas mixture is then catalytic burned in a combustion section 19. The catalytic combustion heat generating device 8 comprises a temperature control device 20 which controls the combustion temperature. More specifically, the temperature control device 20 controls a gas mixture amount supplied to the combustion section 19 to adjust the combustion temperature. The heat, thus generated from the catalytic combustion heat generating device 8, is transmitted to the container 6 via the heat transfer board 9, so as to heat the container 6.

Figure 6:
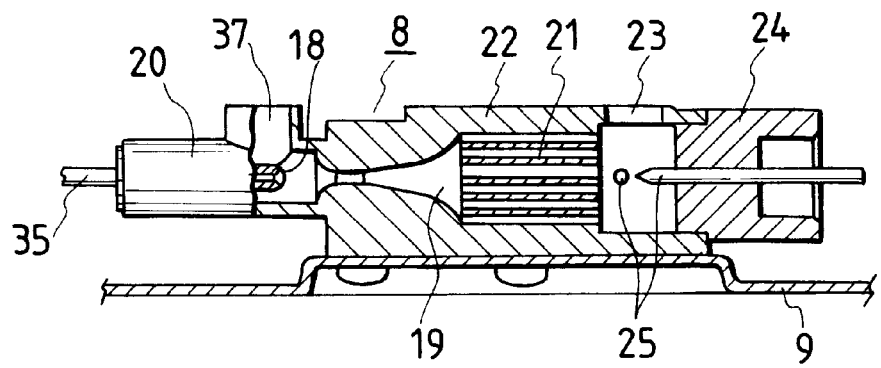
FIG. 6 is an enlarged cross-sectional view showing an arrangement of a combustion section incorporated in the catalytic combustion heat generating device of the delivery warmer in accordance with the first embodiment of the present invention.

FIG. 6 shows a detailed arrangement of the combustion section 19. The combustion section 19 comprises a catalyst body 21 which supports the catalyst by a corrugated carrier. The catalyst body 21 is disposed in a cylindrical casing 22 made of a heat conductive member, such as aluminum and copper. The casing 22 has an exhaust port 23 opened on a side wall thereof An electric insulator 24, such as ceramic, is located downstream of the catalyst body 21 and coupled with the end of the casing 22. The electric insulator 24 is associated with discharge electrodes 25 which causes spark to ignite the catalyst body 21.

Figure 7:
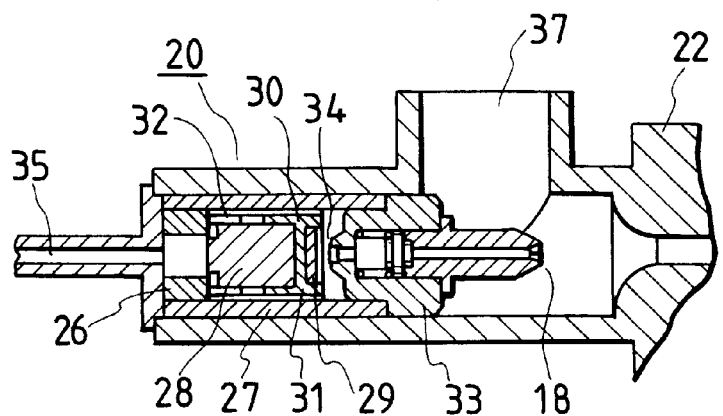
FIG. 7 is an enlarged cross-sectional view showing an arrangement of a temperature control device incorporated in the catalytic combustion heat generating device of the delivery warmer in accordance with the first embodiment of the present invention.

FIG. 7 shows a detailed arrangement of the temperature control device 20. The temperature control device 20 comprises a thermal sensitive ferrite 26, i.e.,thermal sensitive magnetic substance, having magnetic characteristics varying rapidly at its Curie point (e.g., 120° C.). The thermal sensitive ferrite 26 is formed into a ring shape and fixed along an inside wall of a cylindrical outer shell 27. A magnet 28 is disposed adjacent to the thermal sensitive ferrite 26 in an axially opposed relationship. The magnet 28 has one axial end surface attracting the thermal sensitive ferrite 26 in an axial direction of a cylindrical body of the temperature control device 20. A valve member 29 is held at an opposite axial end surface of the magnet 28. A cylindrical valve retainer 31 is fixed to the inside wall of the outer shell 27. A predetermined clearance 30 is provided in a radial direction between an outer wall of the valve retainer 31 and the inside wall of the outer shell 27. A spring 32 is interposed between the magnet 28 and the thermal sensitive ferrite 26. In other words, the spring 32 urges the magnet 28 toward an outgoing direction with respect to the thermal sensitive ferrite 26.

A valve body 33 has one axial end formed with a valve port 34 which opposes the valve member 29 so as to constitute a valve arrangement cooperatively. The nozzle 18 is provided at an opposite axial end of the valve body 33. The nozzle 18 injects the fuel gas toward the catalyst body 21. According to the arrangement shown in FIG. 7, a flowing direction of the fuel gas is identical with a closing direction of the valve. The outer shell 27 is inserted into a cylindrical bore of the casing 22 at the axial end thereof, and press fitted along the inside wall of the cylindrical bore of the casing 22. A fuel gas feeder 35 is provided at an outermost end of the temperature control device 20. The fuel gas feeder 35 is connected via an operating section 36 to the fuel tank 13 storing liquefied fuel gas. The operating section 36 has a function of adjusting a flow amount of the fuel gas. An intake port 37 is provided adjacent to the nozzle 18 opposing the catalyst body 21. Fresh air is directly introduced toward the nozzle 18 through this intake port 37 from outside.

An operation and function of the above-described delivery warmer will be explained hereinafter. The container 6 accommodates the cooked food having a temperature higher than a room temperature. The container 6 is entered into the container storage 7 from the opening 3 of the container casing 1. The lid 4 is folded upward to joint the mated surface fasteners 5, so as to completely close the opening 3.

Next, the operating section 36 of the catalytic combustion heat generating device 8 is remote controlled to supply the fuel gas from the fuel tank 13 to the nozzle 18 via the fuel gas feeder 35. The fuel gas passes the central bore of the thermal sensitive ferrite 26. Then, the fuel gas passes the magnet 28 and the valve retainer 31 successively via the clearance 30, reaching the valve port 34. Finally, the fuel gas is injected from the nozzle 18. The fuel gas flow, caused by the injection from the nozzle 18, induces a suction force for introducing fresh air from the intake port 37. Thus, the fuel gas is mixed with the intake air adequately. The resultant fuel gas mixture is supplied to the catalyst body 21.

An ignition button 38 is disposed on the outer surface of the casing 12 of the catalytic combustion heat generating device 8 located outside the container casing 1, so as to allow an user to activate a continuous discharge igniting device (not shown). Namely, the discharge electrodes 25 cause spark continuously, thereby ensuring that the catalyst body 21 is surely ignited from the side adjacent to the discharge electrodes 25. The catalyst body 21 is configured into an appropriate shape suitable for forming a flame. The catalyst body 21 is heated by the flame thus produced, with a catalytic reaction commencing subsequently.

Once the catalytic reaction commences in the catalyst body 21, the flame will extinguish soon because only exhaust gas is supplied to the flame. The casing 22 of the combustion section 19 is heated by the catalytic reaction. Then, the heat of the casing 22 is transmitted to the heat transfer board 9 which is directly connected to the casing 22.

Furthermore, the temperature of the outer shell 27 is increased by the heat transmitted from the casing 22 of the combustion section 19. The thermal sensitive ferrite 26, fixed to the outer shell 27, receives the heat transmitted from the outer shell 27. When the temperature of the thermal sensitive ferrite 26 reaches and exceeds the Curie point of the thermal sensitive ferrite 26, the magnet 28 cannot attract the thermal sensitive ferrite 26. The Curie point of the thermal sensitive ferrite 26 is dependent on the composition of the thermal sensitive ferrite 26. Thus, the magnet 28 is shifted in the axial direction far from the thermal sensitive ferrite 26 by being urged by the spring 32. The valve member 29 shifts toward the valve body 33 to close the valve port 34. With closure of the valve port 34, no fuel gas is supplied to the catalyst body 21. Accordingly, the temperature of the catalyst body 21 starts decreasing.

The thermal sensitive ferrite 26 has a very small hysteresis. Because of this small hysteresis, the thermal sensitive ferrite 26 restores to its original state in response to a smaller temperature variation equivalent to several degrees. After the thermal sensitive ferrite 26 restores to the original state, the magnet 28 again attracts the thermal sensitive ferrite 26 so as to reopen the valve port 34. This restorative operation is performed within so short period of time that the catalyst body 21 causes no substantial change in its temperature, maintaining a sufficiently higher temperature level. Upon resuming the supply of the fuel gas, the catalytic reaction commences again. By repeating such operations, the casing 22 can be maintained at an appropriate constant temperature.

The control temperature is determined solely depending on the composition of the thermal sensitive ferrite 26. In other words, any temperature control devices, when using the same composition for the their thermal sensitive ferrites, have the same control temperature. Thus, no adjustment is required in the assembling process. This is advantageous for mass production of the temperature control devices 20. Changing the setting temperature can be easily realized by using a different thermal sensitive ferrite 26 having other composition corresponding to the required control temperature.

As described above, the temperature control device 20 controls the combustion temperature during the catalytic reaction. The controlled heat generation makes it possible to maintain the container 6 at a predetermined level. Accordingly, the cooked food accommodated in the container 6 can be maintained at an appropriate temperature.

The continuous discharge igniting device is activated by manipulating the ignition button 38. The discharge electrodes 25 cause spark continuously, thereby ensuring that the catalyst body 21 is ignited from the side adjacent to the discharge electrodes 25. Furthermore, the igniting device can be operated from the outside of the container casing 1 by a remote control.

The fuel tank 13 engages with the catalytic combustion heat generating device 8 and is detachable from the same. The catalytic combustion heat generating device 8 locates outside the container casing 1. Thus, the fuel tank 13 can be easily removed from the container casing 1, without opening the lid 4 of the container casing 1. When the fuel tank 13 becomes empty, the fuel tank 13 is removed from the container casing 1 for recharging of the fuel gas or displacement by another fuel tank filled with the fuel.

Furthermore, both the intake port 37 and the exhaust port 23 locate at the outer surface of the container casing 1. When the container 6 is accommodated and heated in the container casing 1, fresh air can easily flow into the container casing 1 from the outside and is mixed with the fuel gas. On the other hand, the exhaust gas can be easily scavenged out of the container casing 1.

The heat transfer board 9, attached to the catalytic combustion heat generating device 8, can be fixed to the container casing 1 by screwing the legs 15 on the heat transfer board 9 from the outside of the container casing 1. On the contrary, the heat transfer board 9 is disengaged from the container casing 1 by loosening and removing the screws. Then, by opening the fastener 11 of the heat-transfer board storage 10, the heat transfer board 9 can be taken out of the heat-transfer board storage 10. Thus, the catalytic combustion heat generating device 8, attached to the heat transfer board 9, is taken out of the container casing 1 together with the heat transfer board 9.

Furthermore, the heat conductive metallic layer 7a formed on the inside surface of the container storage 7 makes it possible to effectively and quickly heating the inside space of the container storage 7 by using the heat transmitted from the heat transfer board 9. When any food liquid drips off the container 6, it can be easily wiped away.

Moreover, the heat transfer board 9 is housed in the heat-transfer board storage 10 which is provided at the bottom of the container casing 1 and completely separated from the container storage 7. When any harmful insect invades in the container storage 7, it can be easily found and removed off the container storage 7.

As described above, the first embodiment of the present invention provides a delivery warmer comprising a catalytic combustion heat generating device (8), a container (6) accommodating cooked food, and a container casing (1) accommodating the container. The catalytic combustion heat generating device (8) comprises a fuel tank (13) for storing liquefied fuel gas, a nozzle section (18) for gasifying and injecting the liquefied fuel gas, a combustion section (19) for introducing gas mixture of the gasified fuel gas and air and causing a catalytic reaction for burning the gas mixture, and an igniter (38) for igniting the gas mixture and commencing the catalytic reaction, thereby generating heat from the catalytic combustion heat generating device to warm the container accommodated in the container casing.

With this arrangement, the heat generated from the catalytic combustion heat generating device is adequately and smoothly transferred to the container. Thus, it becomes possible to keep the cooked food warm and tasty in the container until the container is delivered to the customers. The catalytic combustion heat generating device, used as the heat generating source, is compact and handy. Due to provision of the catalytic combustion heat generating device, the cooked food can be maintained at a preferable temperature without being influenced by the ambient temperature.

More specifically, a heat transfer board (9), made of a heat conductive metallic member, is assembled with the combustion section (19) to transfer the heat generated from the catalytic combustion heat generating device (8) to the container (6) accommodated in the container casing (1). Providing the heat transfer board is effective to widen a heat radiation area for the combustion section. The inside of the container casing can be warmed up smoothly. In other words, the container accommodating the cooked food can be effectively and uniformly warmed up.

Furthermore, the catalytic combustion heat generating device (8) is disposed under the container casing (1). This arrangement is effective to transfer the heat generated from the combustion section (19) quickly to the inside of the container casing (1). The catalytic combustion heat generating device does not interfere with operator's hands. The container casing can be carried easily while keeping good balance.

Furthermore, the catalytic combustion heat generating device (8) is provided outside the container casing (1), and the fuel tank (13) is detachably engaged with the catalytic combustion heat generating device (8). When the fuel tank becomes empty, the fuel tank can be removed smoothly from the container casing for recharging the fuel tank with liquefied fuel gas. When the empty fuel tank is replaced by another fuel tank, the exchange operation can be performed smoothly.

Furthermore, the igniter (38) is operable from outside of the container casing (1). This facilitates an igniting operation when the container is heated in the container casing.

Furthermore, the catalytic combustion heat generating device (8) is detachable from the container casing (1). When the container casing needs to be cleaned up or is accidentally damaged, the catalytic combustion heat generating device can be easily removed off the catalytic combustion heat generating device. Thus, the container casing can be easily fixed or replaced by a new one.

Furthermore, the container (6) is accommodated in a container storage (7) provided in the container casing (1), and a heat conductive metallic layer (7a) is formed along an inside surface of the container storage (7). With this arrangement, heat of the catalytic combustion heat generating device can be uniformly transferred to every spot in the container storage. When the inside of the container storage is contaminated by liquid, such liquid can be wiped away easily.

Furthermore, a heat-transfer board storage (10) is provided at a lower part of the container casing (1) independent of the container storage (7), and the heat transfer board (9) is accommodated in the heat-transfer board storage (10). When any harmful insect is found in the container storage, it can be removed away easily because no complicated member exists in the container storage. The inside of the container casing can be cleaned up easily and is always kept clean.

Furthermore, the heat-transfer board storage (10) is provided with an opening opened by a fastener (11) so that the heat transfer board (9) can be taken out of the heat-transfer board storage (10). This makes it easy to remove the heat transfer board together with the catalytic combustion heat generating device from the container casing. When the container casing is contaminated or damaged, or when the catalytic combustion heat generating device is damaged or out of order, it becomes easy to fix a troubled portion or replace it by a new one.

Moreover, the container casing (1) is supported by legs (15) which cooperatively provide an installation space under the heat-transfer board storage (10). The catalytic combustion heat generating device (8) is disposed in the installation space, and the legs (15) are connected to the heat transfer board (9) accommodated in the heat-transfer board storage (10). When the container casing hits a hard floor, the shock can be received and absorbed by the legs and the heat transfer board which are both made of rigid members.

As another aspect, the first embodiment of the present invention provides a delivery warmer comprising a catalytic combustion heat generating device (8), a container (6) accommodating cooked food, and a container casing (1) accommodating the container. The catalytic combustion heat generating device (8) comprises a fuel tank (13) for storing liquefied fuel gas, a nozzle section (18) for gasifying and injecting the liquefied fuel gas, a combustion section (19) for introducing gas mixture of the gasified fuel gas and air and causing a catalytic reaction for burning the gas mixture, an igniter (38) for igniting the gas mixture and commencing the catalytic reaction, and a temperature control device (20) for controlling a fuel gas amount supplied to the combustion section (19) so as to adjust a temperature of the combustion section, thereby generating controlled heat from the catalytic combustion heat generating device to maintain the temperature of the container appropriately in the container casing.

By supplying the liquefied fuel gas from the fuel tank, the nozzle section gasifies and injects the liquefied fuel gas. The gasified and injected fuel gas is mixed with air to form gas mixture which is introduced into the combustion section to cause the catalytic reaction to generate heat under the control of the temperature control device. Thus, it becomes possible to maintain the temperature of the container at a desirable value by utilizing the heat generated by the catalytic reaction. This makes it possible to keep the cooked food warm and tasty.

Furthermore, the temperature control device (20) comprises a thermal sensitive magnetic substance (26) whose magnetic characteristics varies rapidly at its Curie point, a magnet (28) provided adjacent to the thermal sensitive magnetic substance in an opposed relationship to attract the thermal sensitive magnetic substance, and a valve (33, 34) adjusting the fuel gas amount supplied to the combustion section. The temperature control device closes the valve to stop supplying the fuel gas to the combustion section when the temperature of the thermal sensitive magnetic substance exceeds its Curie point, thereby controlling the temperature of the combustion section.

The heat generated from the combustion section is transferred to the thermal sensitive magnetic substance. The Curie point is generally dependent on the composition of the magnetic substance. When the temperature of the thermal sensitive magnetic substance reaches its Curie point, the magnet cannot attract the thermal sensitive magnetic substance. Thus, the valve is closed by the function a spring (32) to stop supplying the gas mixture to the combustion section. Upon stopping the gas mixture, the temperature of the combustion chamber is decreased. The thermal sensitive magnetic substance has a very small hysteresis. Due to such a small hysteresis, the thermal sensitive magnetic substance can restore to its original state within a short period of time in response to a tiny decrease in the temperature. Therefore, the thermal sensitive magnetic substance can attract the magnet again so as to open the valve. As the interruption is very short, the combustion section is still maintained at a higher temperature. Thus, the catalytic reaction restarts when the liquefied fuel gas is injected from the nozzle section. By repeating the above-described operation, it becomes possible to maintain the combustion section at a desired temperature for a long time.

Second Embodiment

Figure 8:
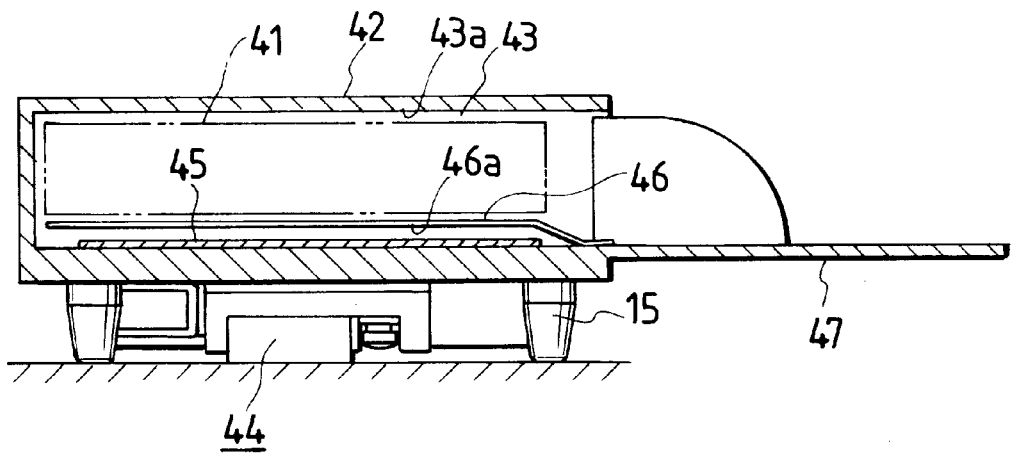
FIG. 8 is a cross-sectional view showing an arrangement of a delivery warmer in accordance with a second embodiment of the present invention.

FIG. 8 shows an arrangement of a delivery warmer in accordance with a second embodiment. As shown in FIG. 8, a container casing 42 comprises a container storage 43 accommodating a container 41. A heat transfer board 45 is disposed at the bottom of the container storage 43. The heat transfer board 45 is heated by a catalytic combustion heat generating device 44. The catalytic combustion heat generating device 44 is the same in construction and function as the catalytic combustion heat generating device 8 shown in the first embodiment. Accordingly, in the catalytic combustion heat generating device 44, although not shown in FIG. 8, the fuel tank 13 stores liquefied fuel gas. The nozzle section 18 gasifies and injects the liquefied fuel gas. The combustion section 19 introduces gas mixture of the gasified fuel gas and air and causes a catalytic reaction for burning the gas mixture. And, the igniter 38 ignites the gas mixture and commences the catalytic reaction.

A protecting sheet 46, provided in the container casing 42, covers the upper surface of the heat transfer board 45. The protecting sheet 46 has a lower surface on which a heat conductive metallic layer 46a is provided adjacent to the heat transfer board 45. The heat conductive metallic layer 46a is, for example, made of a thin aluminum film of approximately 15 µm. The heat conductive metallic layer 46a is coated by a synthetic resin layer having adequate heat resistivity. The synthetic resin layer is, for example, made of a thin polyethylene terephthalate film of approximately 120 µm. The protecting sheet 46 is connected to an opening end of the container casing 42 where a hinged lid 47 is provided so as to open and close the opening of the container casing 42.

According to the arrangement of the second embodiment, the heat transfer sheet 45 is disposed and heated in the container casing 42. The upper surface of the heat transfer sheet 45 is covered by the protecting sheet 46 which is constituted by the heat-resistive synthetic resin film. Accordingly, when the container 41 is entered into the container storage 43, or when the container 41 is taken out of the container storage 43, the protecting sheet 46 surely prevents users' hands from directly touching the heat transfer board 45 heated at a high temperature. The protecting sheet 46 has adequate heat resistivity. Thus, the temperature of the protecting sheet 46 is suppressed within a predetermined safe range causing no damage even when users touch it.

Furthermore, the protecting sheet 46 has the heat conductive metallic layer 46a made of aluminum or the like. The protecting sheet 46 is brought into contact with the heat transfer board 45 via this heat conductive metallic layer 46a. The heat, generated from the catalytic combustion heat generating device 44, can be uniformly transmitted to the container 41 via the heat transfer board 45 and the heat conductive metallic layer 46a. The cooked food accommodated in the container can be warmed uniformly.

The protecting sheet 46 has one end connected to the opening end of the container casing 42. Most of the protecting sheet 46 can be taken out of the container storage 43. Although the heat transfer board 45 is disposed at the bottom of the container storage 43, the upper surface of the heat transfer board 45 is uncovered when the protecting sheet 46 is taken out of the container storage 43. This arrangement makes it possible to easily clean the heat transfer board 45 as well as the protecting sheet 46. Accordingly, the inside space of the container storage 43 can be kept clean. On the other hand, when the container 41 is entered into the container casing 42, the surface of the heat transfer board 45 can be surely covered by the protecting sheet 46. Thus, no interference occurs between the container 41 and the heat transfer board 45.

As apparent from the foregoing description, the second embodiment of the present invention provides a delivery warmer comprising a catalytic combustion heat generating device (44), a container (41) accommodating cooked food, and a container casing (42) accommodating the container. The catalytic combustion heat generating device (44) comprises a fuel tank (13) for storing liquefied fuel gas, a nozzle section (18) for gasifying and injecting the liquefied fuel gas, a combustion section (19) for introducing gas mixture of the gasified fuel gas and air and causing a catalytic reaction for burning the gas mixture, and an igniter (38) for igniting the gas mixture and commencing the catalytic reaction. The container casing (42) is equipped with a heat transfer board (45) made of a heat conductive metallic member and disposed in the container casing for transferring heat generated from the catalytic combustion heat generating device to the container. A surface of the heat transfer board is covered by a protecting sheet (46).

With this arrangement, it becomes possible to surely prevent user's hands from directly touching the high-temperature portion of the heat transfer board when the user enters or takes out the container into or from the container casing.

More specifically, the protecting sheet (46) is constituted by a synthetic resin film comprising a heat conductive metallic layer (46a) provided adjacent to the heat transfer board. Providing the heat conductive metallic layer adjacent to the heat transfer board is effective to realize a uniform heat transfer from the catalytic combustion heat generating device to the container.

More specifically, a lid (47) is provided at an opening end of the container casing (42), and the protecting sheet (46) has one end connected to the opening end of the container casing (42). According to this arrangement, the protecting sheet is hinged at the opening end of the container casing. Therefore, the protecting sheet can be taken out of the container casing when the container casing needs to be cleaned up. The inside of the container casing can be kept clean. On the other hand, when the container is housed in the container casing, the surface of the heat transfer board can be surely covered by the protecting sheet.

Third Embodiment

Figure 9:
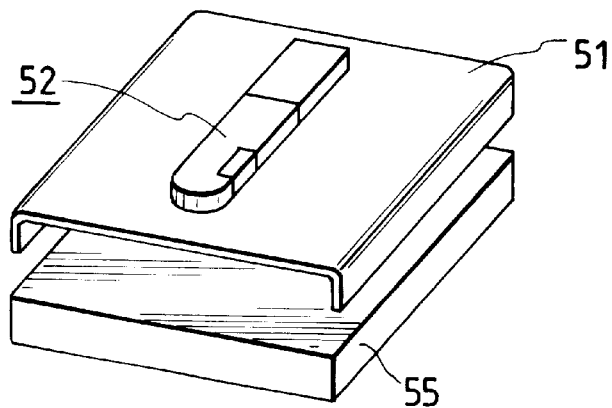
FIG. 9 is a perspective and exploded view showing a delivery warmer in accordance with a third embodiment of the present invention.
Figure 10:
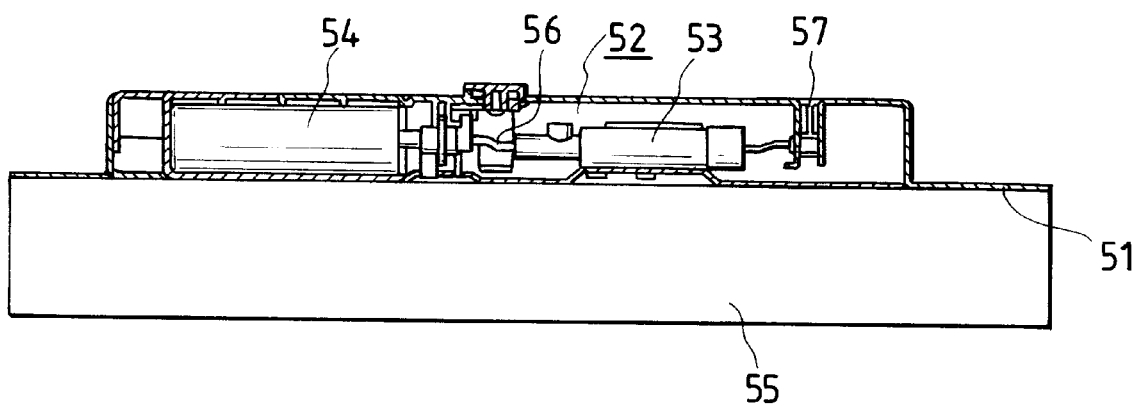
FIG. 10 is a cross-sectional view showing an essential part of the delivery warmer in accordance with the third embodiment of the present invention.
Figure 11:
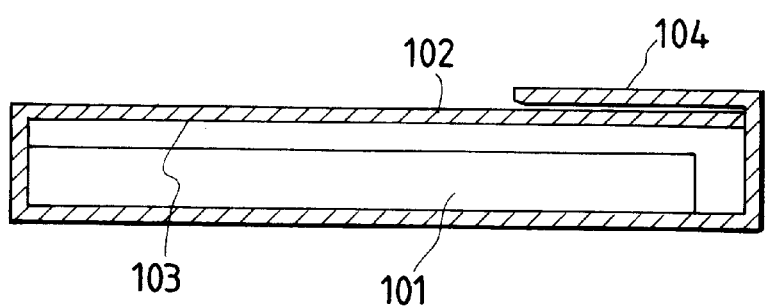
FIG. 11 is a cross-sectional view showing a conventional delivery warmer.

FIGS. 9 and 10 cooperatively show an arrangement of a delivery warmer in accordance with a third embodiment. A heat transfer board 51 is made of heat conductive member, such as aluminum and copper. A catalytic combustion heat generating device 52 is mounted on the upper surface of the heat transfer board 51. Opposing side edges of the heat transfer board 51 are bent downward, so as to form parallel side walls extending perpendicularly from the side edges of a main flat surface of the heat transfer board 51. The catalytic combustion heat generating device 52 comprises a combustion section 53. A fuel tank 54 stores liquefied fuel gas which is supplied to the combustion section 53 via a nozzle section 56. The combustion section 53 is mounted on the heat transfer board 51. An ignition button 57 is disposed on the outer surface of the catalytic combustion heat generating device 52, so as to allow an user to activate a continuous discharge igniting device (not shown) in the same manner as in the first embodiment. Thus, the heat generated from the catalytic combustion heat generating device 52 is transmitted to the heat transfer board 51. A container 55, accommodating cooked food, is detachably engaged with the heat transfer board 51. When the container 55 is engaged with the heat transfer board 51, the container 55 is maintained at an appropriate temperature.

According to the arrangement of the third embodiment, the container 55 can be directly heated by engaging the container 55 with the heat transfer board 51. There is no necessity of accommodating the container 55 in a special casing. Thus, the third embodiment provides a simple method for warming the cooked food at an appropriate temperature in the container 55, keeping the cooked food tasty.

As apparent from the foregoing description, the third embodiment of the present invention provides a delivery warmer comprising a catalytic combustion heat generating device (52), a container (55) accommodating cooked food, and a heat transfer board (51) made of a heat conductive metallic member and connected to the catalytic combustion heat generating device. The catalytic combustion heat generating device (52) comprises a fuel tank (54) for storing liquefied fuel gas, a nozzle section (56) for gasifying and injecting the liquefied fuel gas, a combustion section (53) for introducing gas mixture of the gasified fuel gas and air and causing a catalytic reaction for burning the gas mixture, and an igniter (57) for igniting the gas mixture and commencing the catalytic reaction. The heat transfer board (51) is detachably engaged with the container, thereby transferring heat from the catalytic combustion heat generating device to the container via the heat transfer board. Connecting the heat transfer board with the container is advantageous in that the container can be directly heated. Thus, the cooked food can be effectively warmed up and kept tasty. Furthermore, as the construction is simple, it is handy to deliver.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A delivery warmer comprising: a container accommodating cooked food; a container casing accommodating said container;
   a catalytic combustion heat generating device supported in heat transfer relationship with said container comprising:
   a fuel tank for storing liquefied fuel gas;
   a nozzle section for gasifying and injecting said liquefied fuel gas;
   a combustion section having an inlet facing said nozzle section for receiving a gas mixture of said gasified fuel gas and air, and containing a catalyst body causing a catalytic reaction for burning said gas mixture; and
   an igniter extending into said combustion section for igniting said gas mixture in said combustion section and commencing said catalytic reaction, thereby generating heat from said catalytic combustion heat generating device which is transferred to said container to warm said container accommodated in said container casing.

2. The delivery warmer in accordance with claim 1, wherein a heat transfer board, made of a heat conductive metallic member, is assembled with said combustion section to transfer the heat generated from said catalytic combustion heat generating device to said container accommodated in said container casing.

3. The delivery warmer in accordance with claim 1, wherein said catalytic combustion heat generating device is supported to said container casing.

4. The delivery warmer in accordance with claim 1, wherein said catalytic combustion heat generating device is attached to an outside surface of said container casing, and
   said fuel tank is detachably engaged with said catalytic combustion heat generating device.

5. The delivery warmer in accordance with claim 1, wherein said igniter includes connections extending outside of said container casing and is operable from outside of said container casing.

6. The delivery warmer in accordance with claim 1, wherein said catalytic combustion heat generating device is detachedly connected to said container casing.

7. The delivery warmer in accordance with claim 1, wherein said container is accommodated in a container storage provided in said container casing, and a heat conductive metallic layer is formed along an inside surface of said container storage.

8. The delivery warmer in accordance with claim 1, wherein said container is accommodated in a container storage provided in said container casing, a storage is provided at a lower part of said container casing independent of said storage container for receiving a heat transfer board.

9. The delivery warmer in accordance with claim 8, wherein said storage is provided with an opening to permit said heat transfer board to be removed from said storage.

10. The delivery warmer in accordance with claim 8, wherein said container casing is supported by legs which provide an installation space under said storage, said catalytic combustion heat generating device is disposed in said installation space, and said legs are connected to said heat transfer board in said storage.

11. A delivery warmer comprising a catalytic combustion heat generating device in a heat transfer relationship with a container accommodating cooked food, and a container casing accommodating said container, wherein
   said catalytic combustion heat generating device comprises:
   a fuel tank for storing liquefied fuel gas;
   a nozzle section for gasifying and injecting said liquefied fuel gas;
   a combustion section having an inlet for receiving a gas mixture of said gasified fuel gas and air and containing a catalytic body for causing a catalytic reaction for burning said gas mixture,
   an igniter extending into said combustion chamber for igniting said gas mixture and commencing said catalytic reaction, and
   a temperature control device for controlling a fuel gas amount supplied to said combustion section from said nozzle so as to adjust a temperature of said combustion section, thereby generating heat from said catalytic combustion heat generating device to warm said container accommodated in said container casing.

12. The delivery warmer in accordance with claim 11, wherein said temperature control device comprises a thermal sensitive magnetic substance whose magnetic characteristics varies rapidly at its Curie point, a magnet provided adjacent to said thermal sensitive magnetic substance in an opposed relationship to attract said thermal sensitive magnetic substance, and a valve adjusting said fuel gas amount supplied to said combustion section, wherein said temperature control device closes said valve to stop supplying said fuel gas to said combustion section when the temperature of said thermal sensitive magnetic substance exceeds its Curie point, thereby controlling the temperature of said combustion section.

13. A delivery warmer comprising a container accommodating cooked food; a container casing accommodating said container;
   a catalytic combustion heat generating device comprising:
   a fuel tank for storing liquefied fuel gas;
   a nozzle section for gasifying and injecting said liquefied fuel gas;
   a combustion section having an inlet for receiving a mixture of said gasified fuel gas and air and causing a catalytic reaction for burning said gas mixture; and
   an igniter extending into said combustion section for igniting said gas mixture and commencing said catalytic reaction, and
   a heat transfer board made of a heat conductive metallic member having a surface covered by a protecting sheet, disposed in said container casing for transferring heat generated from said catalytic combustion heat generating device to said container.

14. The delivery warmer in accordance with claim 13, wherein said protecting sheet is constituted by a synthetic resin film comprising a heat conductive metallic layer provided adjacent to said heat transfer board.

15. The delivery warmer in accordance with claim 13, wherein a lid is provided at an opening end of said container casing, and said protecting sheet has one end connected to said opening end of said container casing.

16. A delivery warmer comprising: a container accommodating cooked food;
   a catalytic combustion heat generating device which comprises:
   a fuel tank for storing liquefied fuel gas;
   a nozzle section for gasifying and injecting said liquefied fuel gas;
   a combustion section having an inlet for receiving a mixture of said gasified fuel gas and air and having a catalytic body for causing a catalytic reaction for burning said gas mixture; and
   an igniter extending into said combustion section for igniting said gas mixture and commencing said catalytic reaction,
   a heat transfer board made of a conductive metallic member detachably engaged with said container, and connected with said combustion heat generating device, for transferring heat from said catalytic combustion heat generating device to said container via said heat transfer board.

17. A delivery warmer comprising:
   a catalytic combustion heat generating device which comprises:
   a fuel tank for storing liquefied fuel gas;
   a nozzle section for gasifying and injecting said liquefied fuel gas;
   a combustion section having an inlet for receiving a gas mixture of said gasified fuel gas and air and having a catalytic body for causing a catalytic reaction for burning said gas mixture; and
   an igniter extending into said combustion section for igniting said gas mixture and commencing said catalytic reaction;
   a container for holding cooked food;
   a container casing accommodating said container; and
   a heat transfer board made of a heat conductive metallic member connected to said combustion section and positioned in a heat transfer relationship with said container, thereby transferring heat from said combustion section to said container via said heat transfer board.

18. A delivery warmer comprising: a container accommodating cooked food; a container casing accommodating said container;
   a catalytic combustion heat generating device disposed on an under side of said container casing comprising:
   a fuel tank for storing liquefied fuel gas;
   a nozzle section for gasifying and injecting said liquefied fuel gas;
   a combustion section having an inlet for requiring a gas mixture of said gasified fuel gas and air and having a catalytic body for causing a catalytic reaction for burning said gas mixture,
   an igniter extending into said combustion section for igniting said gas mixture and commencing said catalytic reaction; and
   a heat transfer board made of a heat conductive metallic member connected to said combustion section, so that heat generated from said combustion section is transferred to said container via said heat transfer board.

19. A delivery warmer comprising a catalytic combustion heat generating device, a container accommodating cooked food, and a container casing accommodating said container, wherein
   said catalytic combustion heat generating device comprises:
   a fuel tank for storing liquefied fuel gas;
   a nozzle section for gasifying and injecting said liquefied fuel gas;
   a combustion section for introducing gas mixture of said gasified fuel gas and air and causing a catalytic reaction for burning said gas mixture; and
   an igniter for igniting said gas mixture and commencing said catalytic reaction,
   said catalytic combustion heat generating device is disposed under said container casing, and
   said delivery warmer further comprising:
   a heat transfer board made of a heat conductive metallic member and connected to said combustion section;
   a container storage for accommodating said container and provided in said container casing;
   a heat-transfer board storage provided at a lower part of said container casing independent of said container storage, so that said heat transfer board can be accommodated in said heat-transfer board storage, thereby transferring heat from said catalytic combustion heat generating device to said container via said heat transfer board.

* * * * *

UNITED STATES PATENT AND TRADEMARK OFFICE
CERTIFICATE OF CORRECTION

PATENT NO.     : 5,947,109
DATED          : September 7, 1999
INVENTOR(S)    : Sinichiro Kobayasi et al.

Page 1 of 1

It is certified that error appears in the above-identified patent and that said Letters Patent is hereby corrected as shown below:

Title page,
Item [30], Foreign Application Priority Data, the second-listed priority document number is incorrect. "8-298268" should read -- 9-298268 --.

Signed and Sealed this

Twenty-first Day of May, 2002

Attest:

JAMES E. ROGAN
Attesting Officer     Director of the United States Patent and Trademark Office